(12) United States Patent
Khosla et al.

(10) Patent No.: US 12,408,014 B2
(45) Date of Patent: Sep. 2, 2025

(54) VEHICLE NUDGE VIA C-V2X

(71) Applicant: QUALCOMM Incorporated, San Diego, CA (US)

(72) Inventors: Abha Khosla, San Diego, CA (US); Soumya Das, San Diego, CA (US); Srujith Reddy Katamreddy, Ingolstadt (DE)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 17/845,339

(22) Filed: Jun. 21, 2022

(65) Prior Publication Data

US 2023/0413026 A1 Dec. 21, 2023

(51) Int. Cl.
| | | |
|---|---|---|
| *H04W 4/90* | (2018.01) | |
| *H04W 4/12* | (2009.01) | |
| *H04W 4/38* | (2018.01) | |
| *H04W 4/40* | (2018.01) | |

(52) U.S. Cl.
CPC ............. *H04W 4/90* (2018.02); *H04W 4/12* (2013.01); *H04W 4/38* (2018.02); *H04W 4/40* (2018.02)

(58) Field of Classification Search
CPC .......... H04W 4/90; H04W 4/12; H04W 4/38; H04W 4/40; H04W 4/46; H04W 4/44; G08G 1/096791; B60W 30/16; B60W 50/14; B60W 2556/45; B60W 2556/65; B60W 30/18163
See application file for complete search history.

(56) References Cited

U.S. PATENT DOCUMENTS

| | | | |
|---|---|---|---|
| 9,922,559 B1 | 3/2018 | Inoue | |
| 10,769,952 B2 | 9/2020 | Graham | |
| 2020/0236521 A1* | 7/2020 | Vassilovski | .......... G08B 29/188 |
| 2021/0005082 A1* | 1/2021 | Tsfasman | ............. G08G 1/0112 |
| 2021/0286366 A1* | 9/2021 | Inoue | ................... G05D 1/0276 |
| 2022/0028264 A1* | 1/2022 | Lund | ................ G08G 1/096783 |
| 2022/0258729 A1 | 8/2022 | Kim et al. | |
| 2022/0309919 A1* | 9/2022 | Hoh | ..................... G08G 1/0112 |
| 2023/0124781 A1* | 4/2023 | Tapia | ..................... H04W 4/46 |
| | | | 342/60 |

FOREIGN PATENT DOCUMENTS

| | | |
|---|---|---|
| JP | 2016126701 A | 7/2016 |
| WO | 2021025250 A1 | 2/2021 |

OTHER PUBLICATIONS

International Search Report and Written Opinion—PCT/US2023/024649—ISA/EPO—Sep. 20, 2023.

* cited by examiner

*Primary Examiner* — Anthony S Addy
*Assistant Examiner* — Jason Utley
(74) *Attorney, Agent, or Firm* — SUNSTEIN LLP

(57) ABSTRACT

Techniques are provided for utilizing vehicle nudge information with V2X communication links. An example method for providing nudge information includes detecting a roadway gap proximate to a first vehicle in an area containing a plurality of vehicles, generating a nudge message based at least in part on the roadway gap, and transmitting the nudge message.

30 Claims, 14 Drawing Sheets

```
-- Road Safety Message is abbreviated as RSM in type definitions and comments below
RoadSafetyMessage ::= SEQUENCE {
    -- This mandatory container describes generic information about the event.
    commonContainer         CommonContainer, situationalContainer    SituationalContainer    OPTIONAL,  --

-- The following application containers describe use-case specific
    -- information about the event.
    rszContainer            ReducedSpeedZoneContainer   OPTIONAL, --
    laneClosureContainer    LaneClosureContainer        OPTIONAL, --
    curveContainer          CurveContainer              OPTIONAL, --
    dynamicInfoContainer    DynamicInfoContainer        OPTIONAL, -- traditional "DMS"-type display
    incidentsContainer      IncidentsContainer          OPTIONAL, -- vehicleGapContainer     VehicleGapContainer         OPTIONAL, -- indicates to reduce gap between
front vehicle -- the "regional" field here is left for backwards compatibility but should not be used
    regional                SEQUENCE
        (SIZE(1..4)) OF DSRC.RegionalExtension {{REGION.Reg-RoadsideSafetyMessage}} OPTIONAL,
    ...
}
```

ASN.1 Representation:
```
VehicleGapContainer     ::= SEQUENCE {
    gapDistance         GapDistance     OPTIONAL, -- Indicates amount of gap present
```

*FIG. 9*

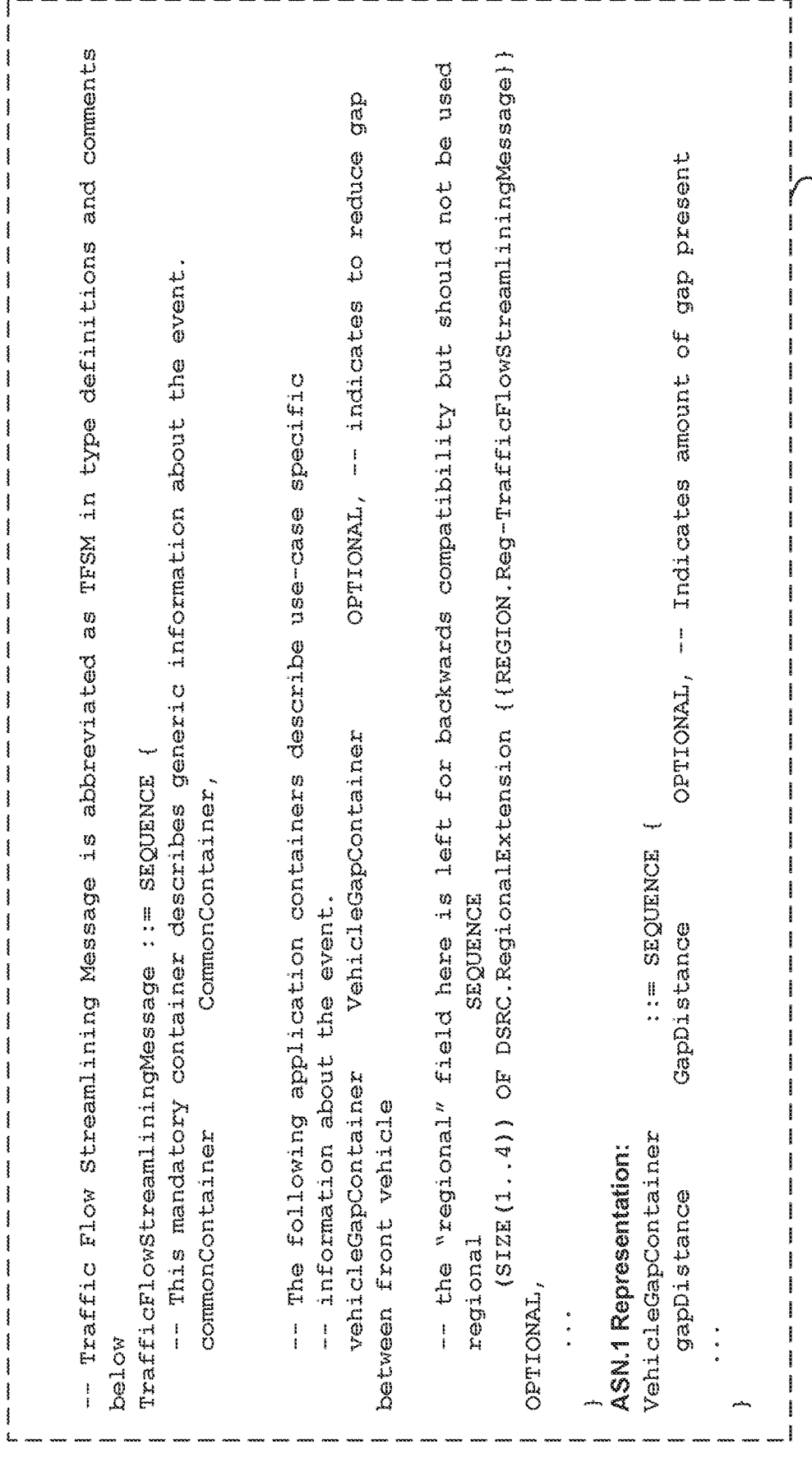

```
-- Traffic Flow Streamlining Message is abbreviated as TFSM in type definitions and comments
below
TrafficFlowStreamliningMessage ::= SEQUENCE {
    -- This mandatory container describes generic information about the event.
    commonContainer         CommonContainer, -- The following application containers describe use-case specific
    -- information about the event.
    vehicleGapContainer     VehicleGapContainer     OPTIONAL,  -- indicates to reduce gap
between front vehicle -- the "regional" field here is left for backwards compatibility but should not be used
    regional                SEQUENCE
      (SIZE(1..4)) OF DSRC.RegionalExtension {{REGION.Reg-TrafficFlowStreamliningMessage}}
OPTIONAL,
    ...
}

ASN.1 Representation:
VehicleGapContainer         ::= SEQUENCE {
    gapDistance       GapDistance       OPTIONAL,  -- Indicates amount of gap present
    ...
}
```

FIG. 10

VEHICLE NUDGE VIA C-V2X

BACKGROUND

The following relates generally to wireless communications, and more specifically to providing nudge instructions to vehicles via vehicle-to-everything (V2X) communication links.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications) and may support various radio frequency and/or baseband capabilities. In some cases, direct communications between wireless devices may include direct communications between vehicles and systems that use such communications may sometimes be referred to as vehicle-to-everything (V2X) communication systems. V2X communication links may be configured to convey important information between vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity, etc.) in unencrypted messages so that other vehicles may receive such information.

SUMMARY

An example method for providing nudge information according to the disclosure includes detecting a roadway gap proximate to a first vehicle in an area containing a plurality of vehicles, generating a nudge message based at least in part on the roadway gap, and transmitting the nudge message.

Implementations of such a method may include one or more of the following features. One or more basic safety messages may be received from the plurality of vehicles, such that detecting the roadway gap is based at least in part on the one or more basic safety messages. Image information may be received from one or more cameras disposed in the area, such that detecting the roadway gap is based at least in part on the image information. The nudge message may be an enhanced roadside safety message including a vehicle gap container. The vehicle gap container may include an indication of a length of the roadway gap. The nudge message may be a traffic flow streamlining message. Transmitting the nudge message may include transmitting a unicast message from a roadside unit to the first vehicle. Transmitting the nudge message may include transmitting the nudge message from a cellular base station to the first vehicle. Transmitting the nudge message may include transmitting the nudge message from a second vehicle to the first vehicle, such that the second vehicle may be configured to detect the roadway gap proximate to the first vehicle, and to generate the nudge message based at least in part on the roadway gap. Transmitting the nudge message may include transmitting the nudge message from a multi-access edge computing (MEC) server to the first vehicle. The nudge message may be transmitted via a wide area network communication protocol. The nudge message may be groupcast to the plurality of vehicles. Transmitting the nudge message may include transmitting the nudge message to a roadside entity proximate to the first vehicle. The roadside entity may be a traffic light including a rectangular rapid flashing beacon. The roadside entity is a road sign.

An example method for responding to a nudge message according to the disclosure includes providing one or more basic safety messages to a roadside unit, receiving the nudge message, and performing a vehicle response based on the nudge message.

Implementations of such a method may include one or more of the following features. The nudge message may include an enhanced roadside safety message including a vehicle gap container. The vehicle gap container may include an indication of a length of a roadway gap. The nudge message may be a traffic flow streamlining message. Receiving the nudge message may include receiving the nudge message from a cellular base station. Receiving the nudge message may include receiving the nudge message from a roadside unit. The nudge message may be included in a groupcast message. Receiving the nudge message may include receiving the nudge message from a multi-access edge computing (MEC) server. The vehicle response may include moving an autonomous vehicle into a roadway gap. The vehicle response may include detecting a roadway gap with an onboard sensor, and providing an alert to a vehicle operator in response to detecting the roadway gap. The vehicle response may include presenting a visual representation of a nudge request on a display in a vehicle, presenting an audio representation of the nudge request on an audio output in the vehicle, presenting a haptic response in the vehicle, or any combinations thereof.

Items and/or techniques described herein may provide one or more of the following capabilities, as well as other capabilities not mentioned. Vehicles in heavy traffic areas such as intersections, toll booths, inspections stations, etc. may provide Basic Safety Messages (BSMs) to a proximate roadside unit (RSU). The RSU may be configured to determine roadway gaps between vehicles based on the BSMs. The RSU may also receive other information from cameras and radio frequency (RF) sensing devices to determine the roadway gaps. The RSU may generate a nudge message to notify an operator to move their vehicle into a roadway gap. The RSU may transmit the nudge message or utilize another radio access technology to send the nudge message to the vehicle. Vehicle congestion in heavy traffic areas may be reduced. Other capabilities may be provided and not every implementation according to the disclosure must provide any, let alone all, of the capabilities discussed.

BRIEF DESCRIPTION OF THE DRAWINGS

FIG. 9 is an Abstract System Notation (ASN) representation of an example roadside safety message (RSM) with a nudge request.

FIG. 10 is an ASN representation of an example traffic flow streamlining message to enable nudge requests.

DETAILED DESCRIPTION

Figure 1:
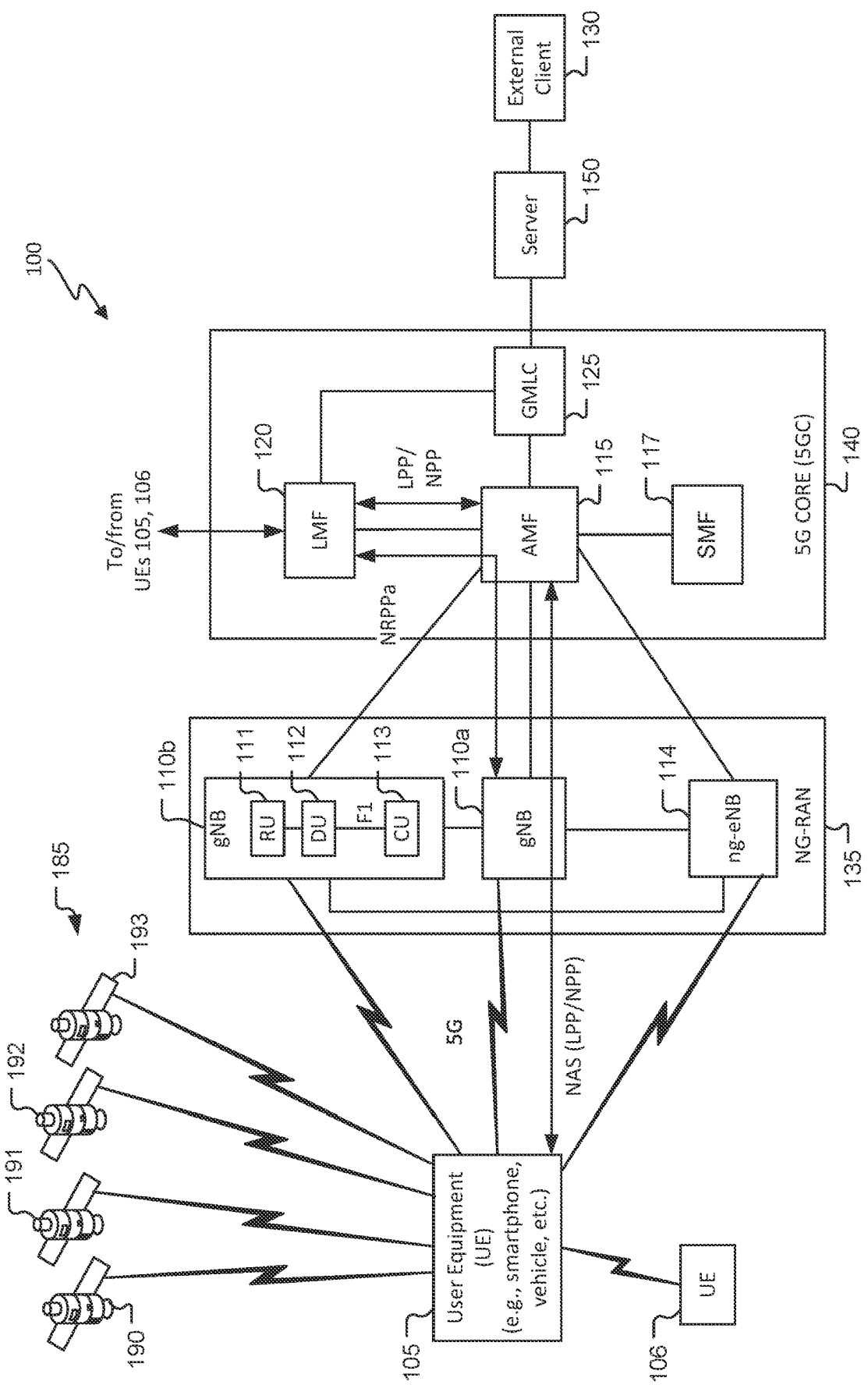
FIG. 1 is a simplified diagram of an example wireless communications system.

Techniques are discussed herein for providing nudge information to vehicles via V2X communication links. V2X, including cellular V2X (C-V2X) technologies, enables radio frequency (RF) communications between vehicles and other wireless nodes, such as other vehicles, roadside units (RSUs), vulnerable road users (VRUs), and cellular networks. In addition to supporting safety applications, C-V2X technology and specifically NR C-V2X, may be utilized for advanced use cases such as cooperative driving and platooning. C-V2X communications may also be utilized in smart road management applications to alleviate road congestion by enabling efficient road usage. An example of an inefficient road usage includes unnecessary large distances between non-moving vehicles waiting at traffic light intersections, toll booths, parking lot exits, inspection stations, etc. Vehicle operators (e.g., drivers) are often oblivious to the fact that they are blocking the lanes and vehicles behind them could easily move to the preferred lane if they had a little more space on the road. This type of inefficiency may lead to such victim vehicles missing their traffic light, causing grievance and at the same time causing traffic buildup. Accordingly, there is a need to utilize C-V2X messages to nudge the vehicles ahead in a crowded roadway.

In an example, a RSU located near an intersection may receive V2X messages such as basic safety messages (BSMs), and/or dedicated short range communications (DSRC) messages from vehicles at the intersection. The messages may include information elements such as the current location (e.g., latitude, longitude, elevation, position accuracy), and other state information associated with a vehicle (e.g., TransmissionAndSpeed, Heading, BrakeSystemStatus, etc.). The RSU may be configured to detect gaps between vehicles based on the BSM information. In an example, one or more cameras located at the intersection may be configured to detect gaps between vehicles based on image analysis. The RSU may provide instructions to the vehicles that are causing the gaps to nudge forward to close up the gap. The instructions may cause an autonomous vehicle to move forward, or they may cause a notification on a display to alert a vehicle operator to move forward. In an example, other signaling methods external to a vehicle such as road signs and traffic lights may be used to alert operators to move their vehicles and close up the gaps. Other configurations, however, may be used.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, on-board unit (OBU), etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. A UE disposed in a vehicle may be called an on-board unit (OBU). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations. e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA). LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b.

The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS. RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
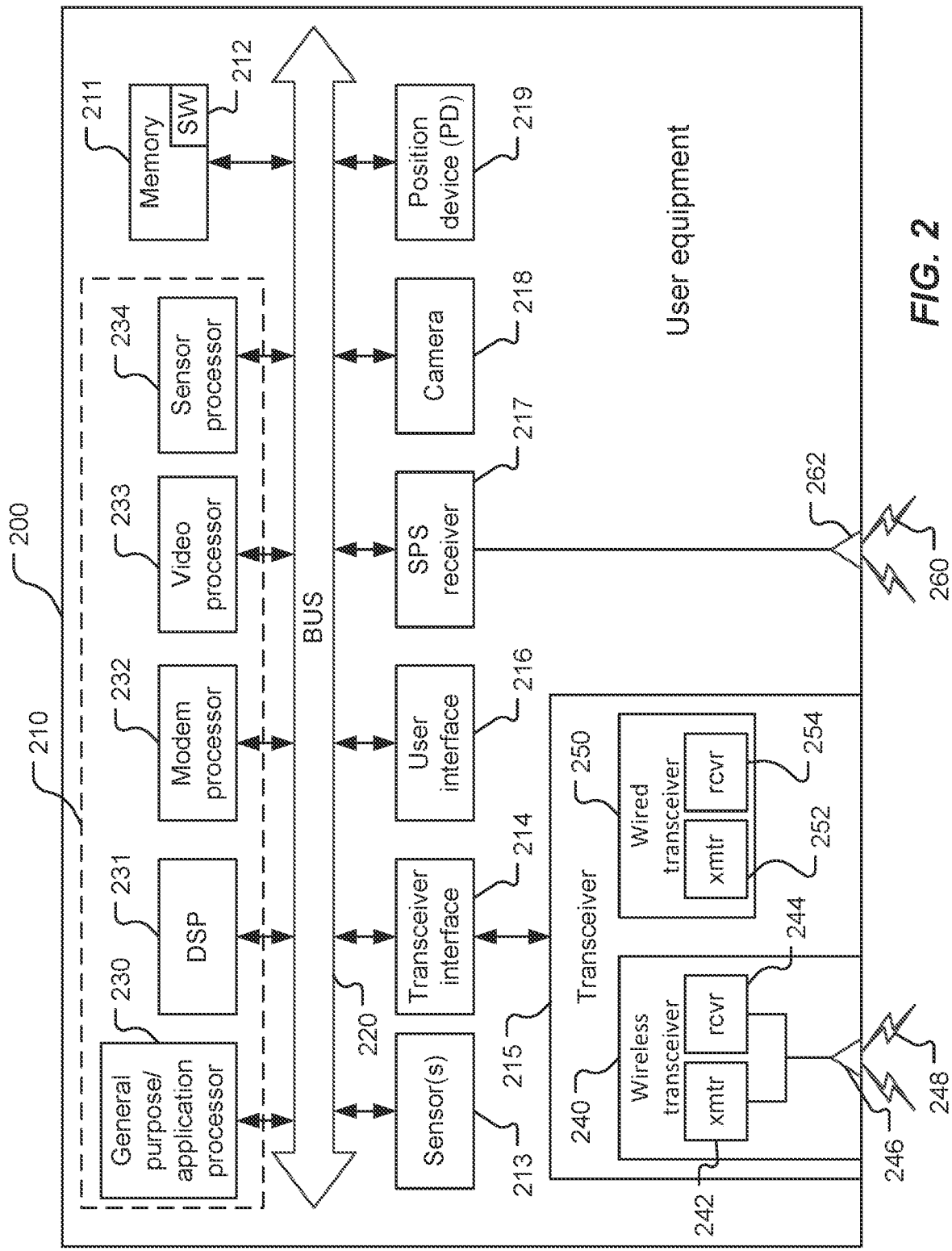
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
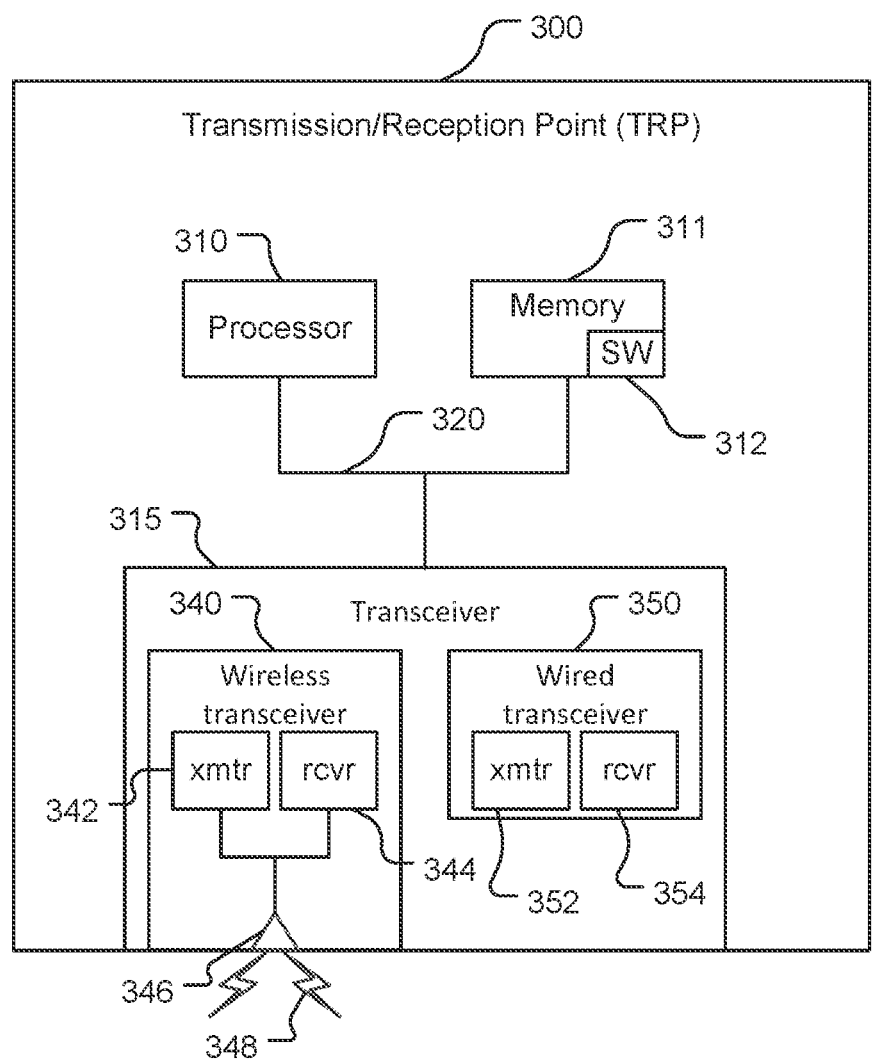
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In an example, a RSU may include some or all of the components of a TRP 300.

Figure 4:
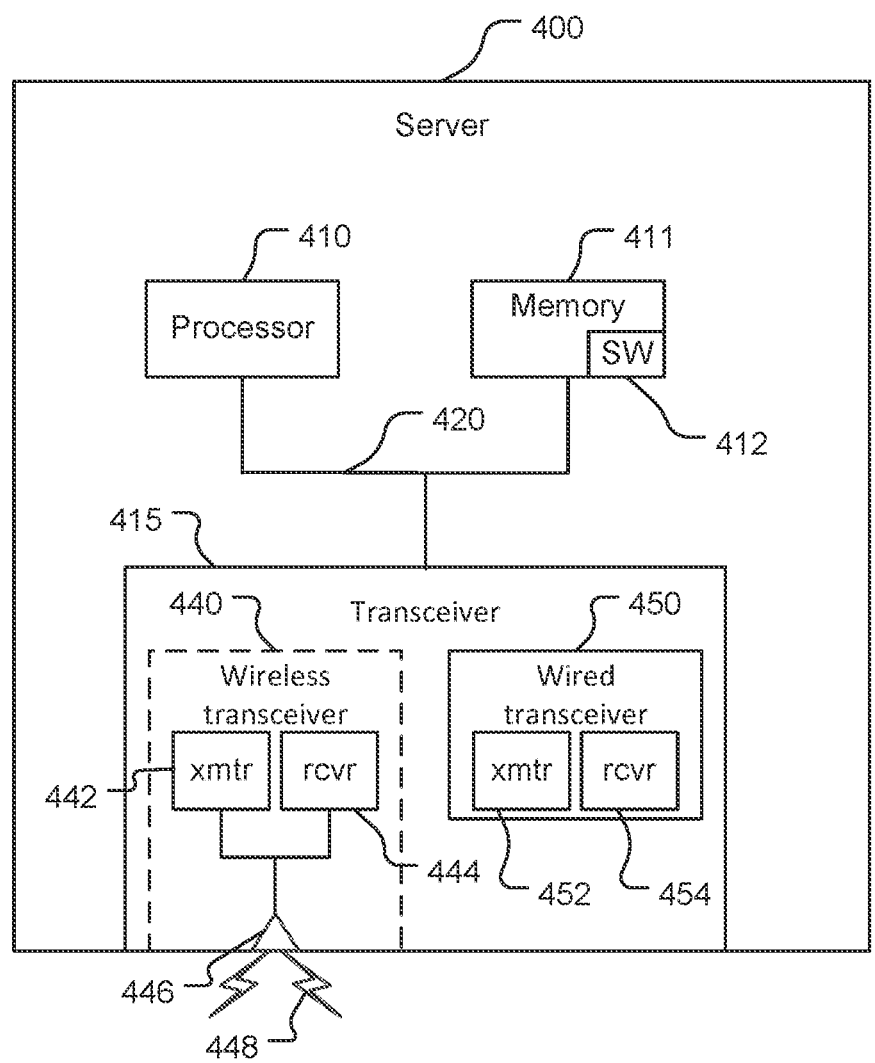
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System). CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning. i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. RS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
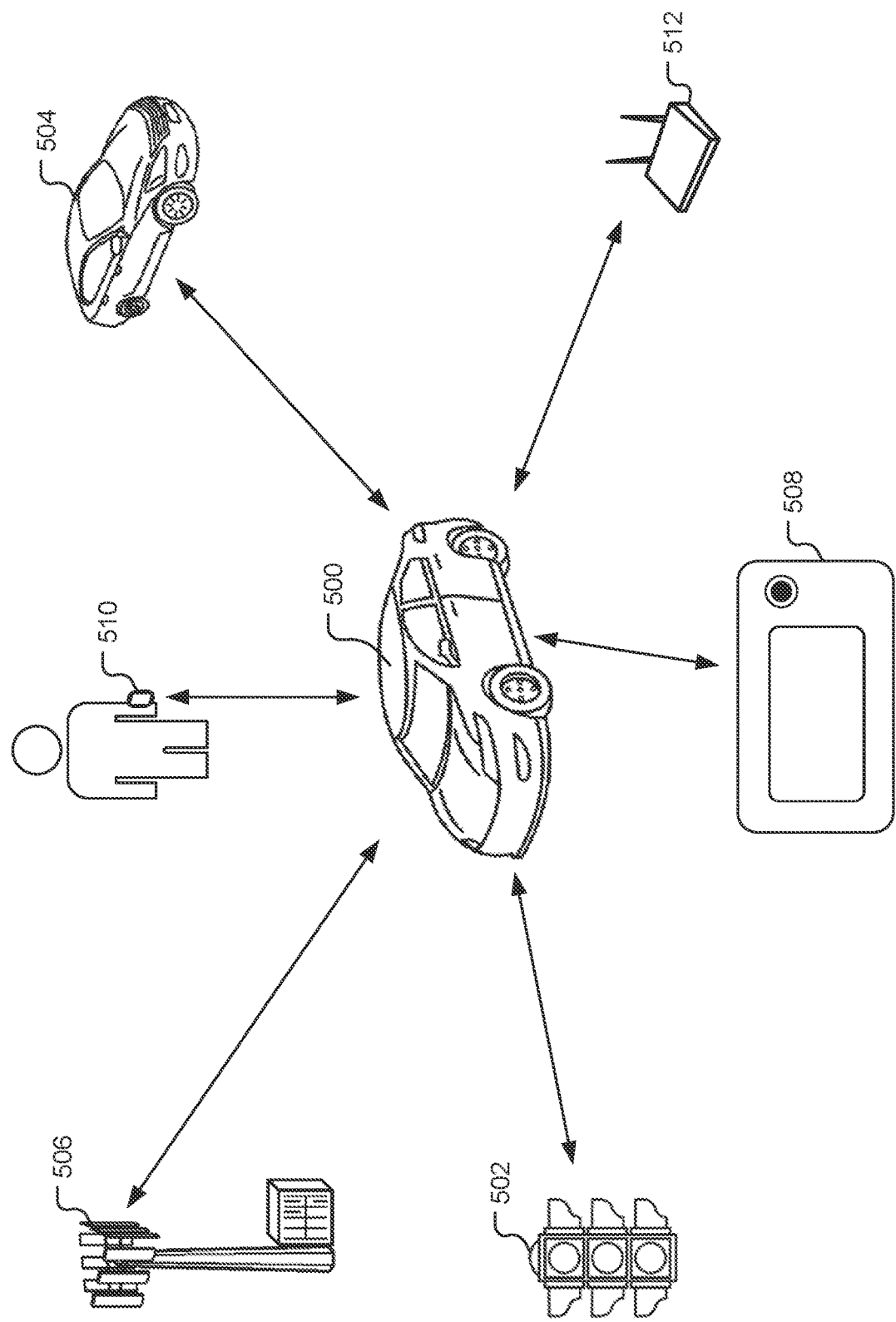
FIG. 5 is a system diagram illustrating the various entities configured to utilize V2X communication links.

Referring to FIG. 5, a system diagram illustrating various entities configured to utilize V2X communication links is shown. In general, V2X communication involves passing information between a vehicle and any other entity that may affect or be affected by the vehicle. A vehicle may include an OBU which may have some or all of the components of the UE 200, and the UE 200 is an example of an OBU. The OBU may be configured to communicate with other entities such as infrastructure (e.g., a stop light), pedestrians, other vehicles, and other wireless node. In an example, V2X may encompass other more specific types of communication such as Vehicle-to-Infrastructure (V2I), Vehicle-to Vehicle (V2V), Vehicle-to-Pedestrian (V2P), Vehicle-to-Device (V2D), and Vehicle-to-Grid (V2G).

Vehicle-to Vehicle (V2V) is a communication model designed to allow vehicles or automobiles to "talk" to each other, typically by having the automobiles form a wireless ad hoc network on the roads. Vehicle-to-Infrastructure (V2I) is a communication model that allows vehicles to share information with the components that support a road or highway system, such as overhead radio-frequency identification (RFID) readers and cameras, traffic lights, lane markers, streetlights, signage and parking meters, and so forth. Similar to V2V communication, V2I communication is typically wireless and bi-directional: data from infrastructure components can be delivered to the vehicle over an ad hoc network and vice versa. Vehicle-to-Pedestrian (V2P) communications involves a vehicle or automobile being able to communicate with, or identify a broad set of road users including people walking, children being pushed in strollers, people using wheelchairs or other mobility devices, passengers embarking and disembarking buses and trains, and people riding bicycles. Vehicle-to-Device (V2D) communications consists in the exchange of information between a vehicle and any electronic device that may be connected to the vehicle itself. Vehicle-to-Grid (V2G) communication may include a vehicle communicating with an electric power grid.

These more specific types of communication are useful for fulfilling various functions. For instance, Vehicle-to-Vehicle (V2V) is especially useful for collision avoidance safety systems, while Vehicle-to-Pedestrian (V2P) is useful for safety alerts to pedestrians and bicyclists. Vehicle-to-Infrastructure (V2I) is useful for optimizing traffic light control and issuing speed advisories, while Vehicle-to-Network (V2N) is useful for providing real-time traffic updates/routing and cloud services.

As referred to herein, V2X communications may include any of these more specific types of communication, as well as any communications between a vehicle and another entity that do not fall under one of these existing communications standards. Thus, V2X is a rather broad vehicular communication system.

V2X communication may be based on Institute of Electrical and Electronics Engineers (IEEE) 802.11 wireless local area network (WLAN) technology, LTE/5G NR PC5 and/or Uu interfaces, with vehicles and entities (e.g., V2X senders) communicating through an ad-hoc network that is formed as two V2X senders come into range with each other. In Cellular-based solutions also exist, such as 5G NR-based V2X, which are capable of leveraging that technology to provide secure communication, precise positioning, and efficient processing. For example, C-V2X may utilize the communications system 100 described in FIG. 1 for V2X communication links.

One benefit of V2X communication is safety. For instance, V2X communication can enable a vehicle to communicate with its surroundings, such that the vehicle can increase driver awareness and provide driving assistance to the driver. For instance, the vehicle may be aware of other moving vehicles and pedestrians on the road. The vehicle can then communicate their locations to the driver, who may be unaware. If accidents are avoided this way, then the safety of the other vehicles and pedestrians on the road is improved. This is just one use case for V2X for improving safety. Other examples of V2X use cases directed to safety include forward collision warning, lane change warning/blind spot warning, emergency electric brake light warning, intersection movement assist, emergency vehicle approaching, road works warning, and platooning.

The V2X communication standard also aims to develop an Advanced Driver Assistance System (ADAS), which helps the driver make critical decisions when it comes to lane changing, speed changing, overtaking speed, and so forth. ADAS can assist driving in challenging conditions, such as bad weather, low lighting, low visibility, and so forth. ADAS can also be used for non-line-of-sight sensing, overtaking (e.g., passing other vehicles on the road), cooperative driving, and do not pass (DNP) alerts.

V2X communication standards may also provide assistance in different modes. A first V2X mode may be utilize to increase driver awareness. For example, the vehicle can use its knowledge of the positions of the various other vehicles on the road in order to provide the driver a bird's eye view of an intersection, or to provide the driver with see-through capability when driving behind a truck (e.g., the vehicle will visually display to the driver the other vehicles on the other side of the truck that are obscured by the truck). A second V2X mode may be configured to provide cooperative driving and collision avoidance. For example, V2X can be used for platooning to tightly group vehicles on the road by enabling those vehicles to communicate and accelerate/brake simultaneously. V2X can also be used for regulating vehicle speed or overtake negotiation, in which a vehicle is able to signal its intent to overtake other vehicles in order to secure the overtaking situation. A third V2X mode may be utilized by vehicles that are configured for autonomous driving.

In an example, a vehicle 500 may be able to communicate with infrastructure 502 (e.g., a traffic light) using Vehicle-to-Infrastructure (V2I) communication. In some embodiments, the vehicle 500 may be able to communicate with other vehicles on the road, such as vehicle 504, via Vehicle-to Vehicle (V2V) communication. The vehicle 500 may be able to communicate with a cellular station 506 via a cellular protocol such as the Uu interface. The cellular station 506 may be base station such as the gNB 110a, and may include some or all of the components of the TRP 300. In an example, the vehicle 500 may be able to communicate with device 508 via Vehicle-to-Device (V2D) communication. In some of such embodiments, the device 508 may be any electronic device that may be connected to the vehicle itself. For example, the device 508 may be a third party or on-board GPS navigation device, which the vehicle 500 can communicate with to obtain information available to the device 508. If the GPS navigation device had information regarding congested routes, traffic density, the location of other vehicles on the road with similar devices, and so forth, the vehicle 500 may be able to obtain all that information. In an example, the device 508 may include a user interface display, audio, and/or haptic components configured to provide alerts a user.

In an example, the vehicle 500 may be able to detect a UE, or other wireless device, carried by a pedestrian 510 via Vehicle-to-Pedestrian (V2P) technology. For instance, the vehicle 500 may have a detection method such as cameras or sensors that allow the vehicle 500 to detect and confirm the presence of pedestrian 510 on the road. Pedestrian 510 may encompass a broad set of people, including people walking, children being pushed in strollers, people using wheelchairs or other mobility devices, passengers embarking and disembarking buses and trains, people riding bicycles, and so forth.

In an example, the vehicle 500 may be configured to communicate with a roadside unit (RSU) 512, or other networked devices such as a AP. The RSU may be disposed in high traffic areas and may be configured to perform the messaging techniques described herein. The RSU 512 may include some or all of the components of the TRP 300. In general, a RSU is less capable than a TRP since the coverage area of the RSU is less than the TRP.

In some embodiments, the vehicle 500 and the other entities in FIG. 5, may also be able to receive information from a network or server, such as the server 400 (not shown in FIG. 5). The vehicle 500 may be able to communicate with the network and server to receive information about the locations and capabilities of infrastructure 502, vehicle 504, cellular stations 506, pedestrian 510, and the RSU 512 without having to communicate with those entities directly.

Figure 6A:
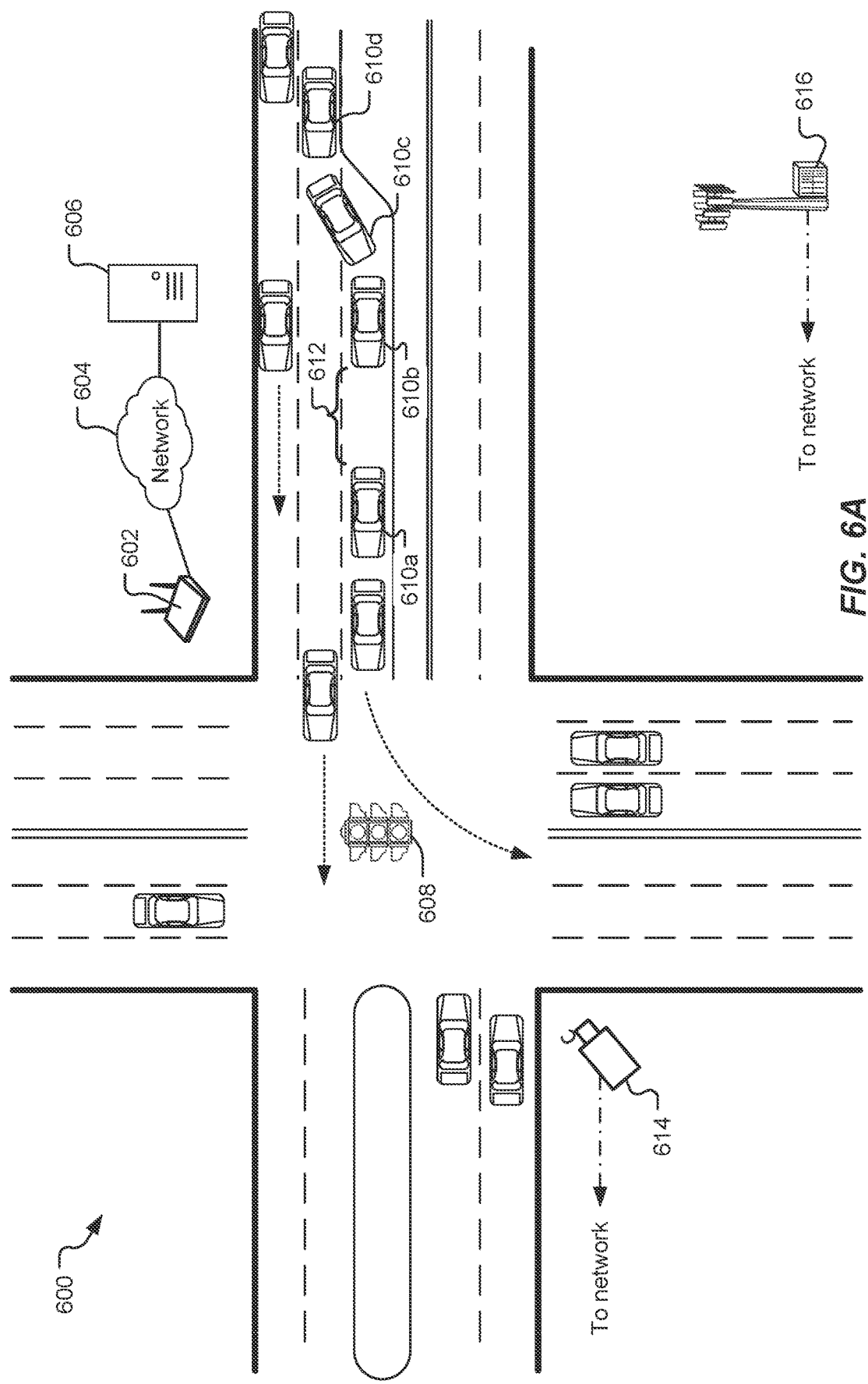
FIGS. 6A-6C include diagrams of an example use case for providing vehicle nudge information.
Figure 6B:
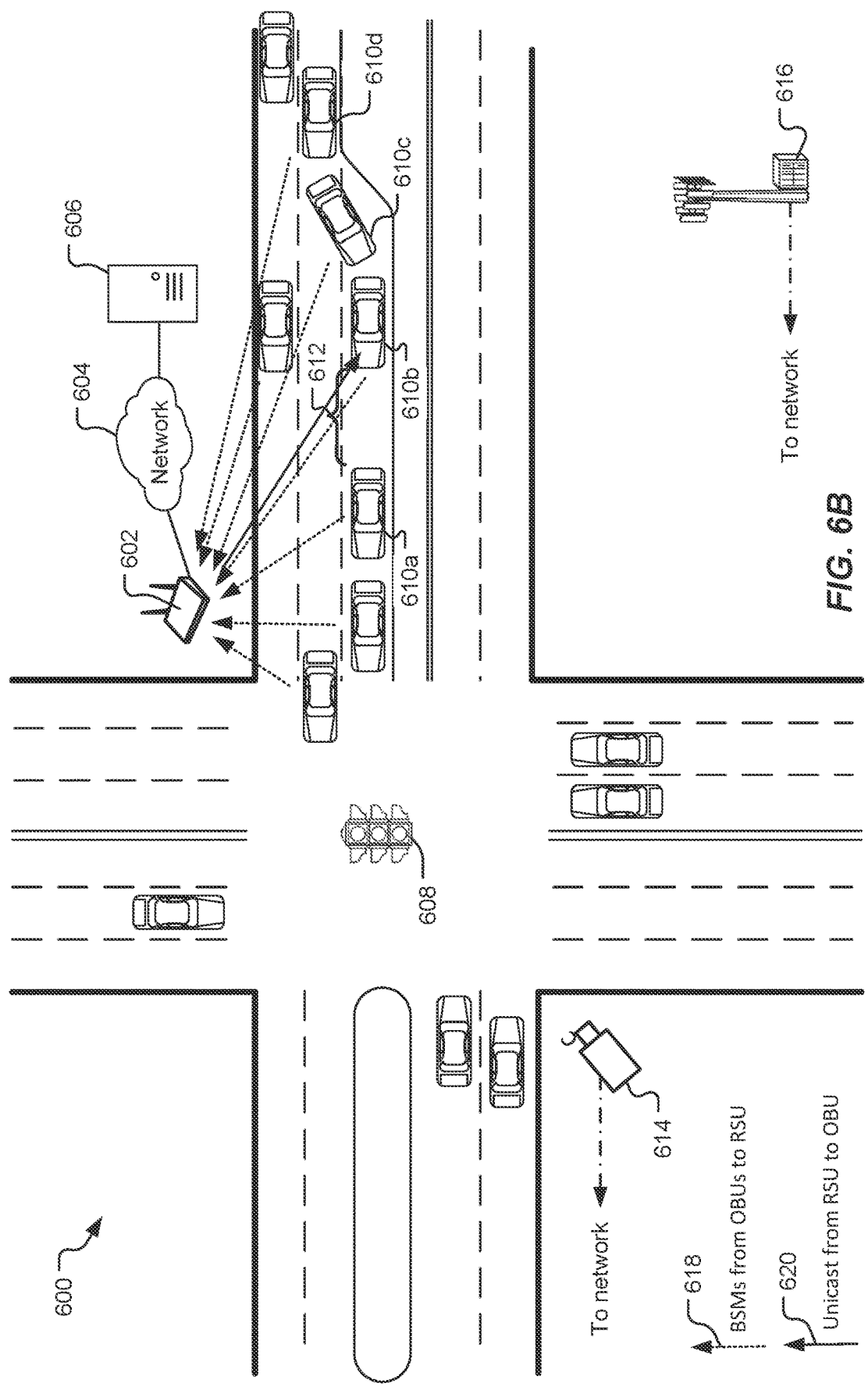
Figure 6C:
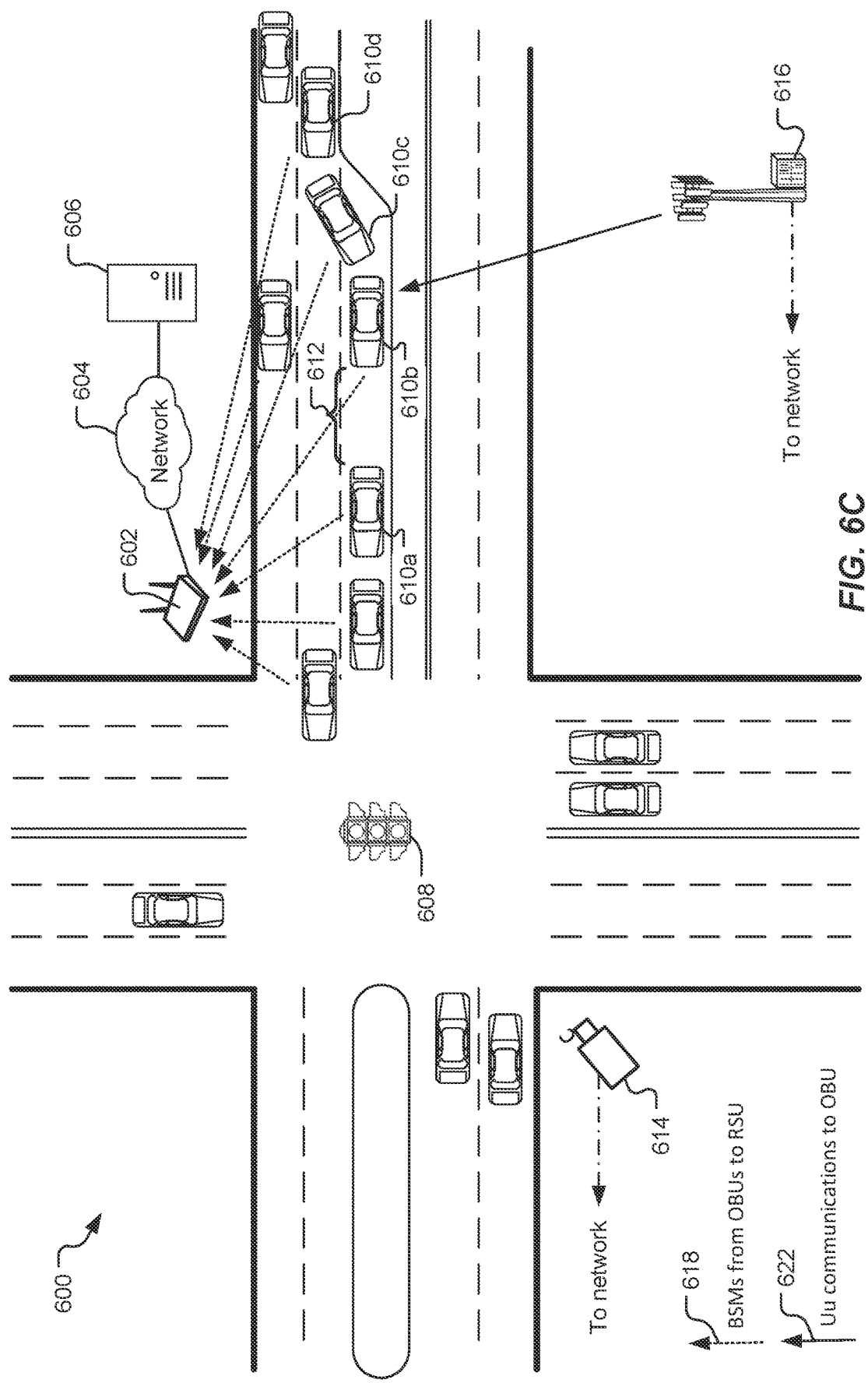

Referring to FIGS. 6A-6C, diagrams of an example use case for providing vehicle nudge information is shown. The diagrams include an intersection 600 with at least one traffic light 608 and a left turn lane to illustrate inefficiencies caused by a gap 612 between vehicles. The intersection 600 includes an RSU 602 configured to communicate with entities proximate to the intersection 600 such as a plurality of vehicles, the traffic light 608, other signal devices and sensors/detectors (e.g., vehicle detection devices, pedestrian crosswalk signals, etc.). The RSU 602 may be communicatively coupled to a server 606 via a network 604. The network 604 may include a WAN and/or the Internet. The intersection 600 may also include one or more cameras 614 configured to capture images of the vehicles at the intersection 600 and provide the image information to the RSU 602, the network 604, and/or the server 606. The intersection 600 may be within the coverage area of one or more cellular base stations, such as the base station 616. The base station 616 may be communicatively coupled to the RSU 602 and/or the server 606 via the network 604. The entities located at the intersection 600 may be configured to utilize V2X communication technologies such as WiFi, PC5 and Uu interfaces. The use case in FIGS. 6A-6C describes a scenario where a plurality of vehicles 610a-d are stopped at the traffic light on the left turn lane. A second vehicle 610b has inadvertently stopped at a distance from a first vehicle 610a. This distance forms the gap 612 in the left turn lane. The gap 612 causes a third vehicle 610c to straddle the lanes and thus block a fourth vehicle 610d from proceeding straight through the intersection. As a result of the third vehicle 610c blocking the lane, the fourth vehicle 610d may miss a through signal on the traffic light 608. Further, the blockage caused by the gap 612, and the resulting position of the third vehicle 610c, may cause more traffic to build up behind the fourth vehicle 610d. The nudge information provided herein may assist in removing the gap 612 to reduce the potential of vehicles in the left turn lane to block the through traffic. The left turn use case depicted in FIGS. 6A-6C is an example, and not a limitation, as other traffic use cases may be assisted by removing gaps between vehicles. For example, traffic backups caused by toll booths, inspection stations, traffic accidents, construction sites, etc. may utilized the techniques provided herein.

In operation, the RSU or another vehicle (e.g., the fourth vehicle 610d) may be configured to provide nudging information to the second vehicle 610b. In an example, the RSU 602 may receive BSMs 618 from the OBUs on the vehicles in the intersection (e.g., including the plurality of vehicles 610a-d). The RSU 602 may be configured to utilize logic to determine that there is an opportunity to nudge certain vehicles forward. The logic may be based on parameters included in the BSMs 618 such as precise positioning, vehicle dimensions, braking state etc. The position information may be based on terrestrial and/or satellite techniques as described herein. In an example, the RSU 602 may query the server 606 to confirm the vehicle placement based at least in part on image information obtained by the one or more cameras 614. The server 606 may be configured to process images/video streams received from the one or more cameras 614 and provide indications of gaps (e.g., the gap 612) to the RSU 602. In an example, the RSU 602 may be configured to receive the image/video information from the one or more cameras 614 and detect the gaps.

In an example, the one or more cameras 614 may be configured to stream live video to the server 606 (e.g., the server 606 may be configured for multi-access edge computing (MEC)) and the server 606 may be configured to detect gaps based on the BSMs received by the RSU 602 and the image information obtained by the one or more cameras 614. In an example, the RSU 602 and the server 606 may be configured to determine the locations of gaps independently and then compare results. One or more vehicles may be notified based on the gaps detected by both the RSU 602 and the server 606.

The RSU 602 may be configured to send unicast messages to the appropriate vehicles based on the gap information. For example, the RSU 602 may send a unicast message 620 to the second vehicle 610b to nudge ahead. The unicast message 620 may be an enhanced RSM message and may include an indication of how far the second vehicle 610b should nudge forward (e.g., x meters). Once the second vehicle 610b moves into the gap 612, the third vehicle 610c may move forward into the gap created behind the second vehicle 610b. In an example, the RSU 602 may then transmit subsequent unicast messages to the third vehicle 610c to fill the new gap (if necessary), and another unicast message to the fourth vehicle 610d (if necessary). The RSU 602 may unicast other messages to vehicles in the intersection 600 to address other gaps as required.

In an example, the RSU 602 may be configured to groupcast a message to a group of vehicles and a corresponding alert may be provided to an operator if the OBU in the vehicle determines there is a gap in front of it, else the OBU will ignore the message. In an example, the first vehicle 610a may include an onboard vehicle radar system and may be configured to detect the gap 612. The first vehicle 610a may be configured to provide a nudge notification to the second vehicle 610b via PC5 and/or DSRC. In an example, the fourth vehicle 610d (i.e., the vehicle being blocked) may be configured to request an initiation of a gap detection process by the RSU 602, or other vehicles at the intersection 600, to generate nudge instructions for one or more of the vehicles. In an example, referring to FIG. 6C, other RATs such as the Uu interface may be utilized to provide nudge instructions. For example, the server 606 and/or the RSU 602, may be configured to send a notification message to the second vehicle 610b via the base station 616 and one or more Uu messages 622.

In an example, the vehicles 610a-d may not be at a complete stop (e.g., they may be rolling forward slowly) and the RSU 602 may be configured to utilize signal change timing information associated with the traffic light 608 to determine if a nudge request is appropriate. For example, Green Light Optimal Speed Advisory (GLOSA) information may indicate that a green light is a few seconds away (e.g., 2, 5, 10, 20 seconds) and thus filling a gap will have a minimal impact on the traffic flow.

The intersection 600 may include one or more non-V2X enabled vehicles which cannot receive a RSM with a nudge request and other signaling devices may be used to alert an operator to nudge forward. In an example, the traffic light 608 and/or other signaling devices may include a flashing light such as a rectangular rapid flashing beacon (RRFB) configured to activate when a gap is to be filled. The RRFB may receive a nudge message (e.g., an RSM) from the RSU 602 and activate a flash pattern in response to the message. In an example, the RSU 602 may be communicatively coupled to one or more cameras 614 and sensors (e.g., RF sensing sensors) configured to detect vehicles in the intersection 600. The intersection 600 may include an electronic display sign configured to show the relative locations of vehicles, and the RSU 602 may determine which vehicles should nudge forward and provide the information via the display board. Other signaling techniques may also be used.

In an example, the timing information for the traffic light 608 may be varied based on the detection of gaps and congestion. For example, the duration of a left turn lane signal may be extended when congestion such as incurred by the fourth vehicle 610d is detected.

Figure 7B:
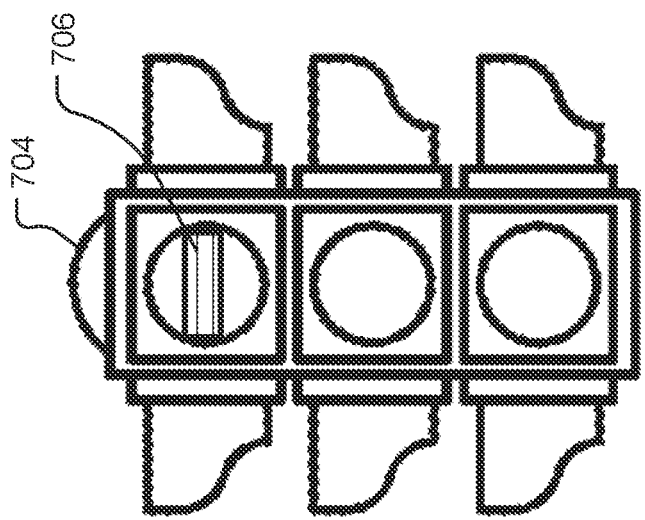
FIGS. 7A and 7B are example nudge indications provided to vehicle operators.
Figure 7A:
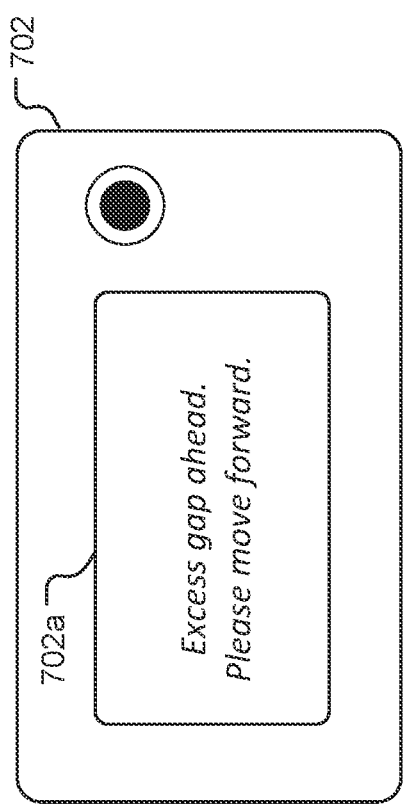

Referring to FIGS. 7A and 7B, example nudge indications provided to vehicle operators are shown. For fully autonomous vehicles (AVs), a RSM message with the nudge information may be sufficient to instruct an AV to move into a gap area. Semi-autonomous or standard vehicles may utilize on-board or external devices to request a vehicle operator to nudge forward. In a first example, an electronic device 702 may include a display 702a configured to alert a vehicle operator when a nudge is requested. The electronic device 702 may be an integrated display in a vehicle dashboard or based on heads-up techniques such that a windshield may be used as the display. The electronic device 702 may be a mobile device such as a smart phone or navigation system configured to communicate with the OBU in the vehicle. In an example, the electronic device 702 may be the OBU in the vehicle. The display may be configured to provide a text message or other indication (e.g., an icon, animation, etc.) to alert an operator of a nudge request. Other user interface components such as speakers, lights and haptic response generators (e.g., vibrating elements) may be used to alert the vehicle operator. In an example, the OBU may be configured to control other onboard devices such as an audio system or dashboard lighting to inform the operator of the nudge request. For example, a voice prompt may be provided to an audio system to request the operator to nudge forward. Other audio and visual indicators may also be used.

In an example, a vehicle may not be configured to receive RSM messages from an RSU or other stations (e.g., gNB) and the nudge indication may be provided to an infrastructure device such as a traffic light 704. The RSU may be communicatively coupled to the traffic light 704 and may activate a RRFB 706 when a gap is detected. An activated RRFB 706 (e.g., flashing) may be used as an indication that gaps are present and the vehicle operators may observe their current positions and close gaps as required. Other infrastructure objects such as crosswalk and road signs may be used to provide visual indicators to vehicle operators in a densely trafficked area.

Figure 8:
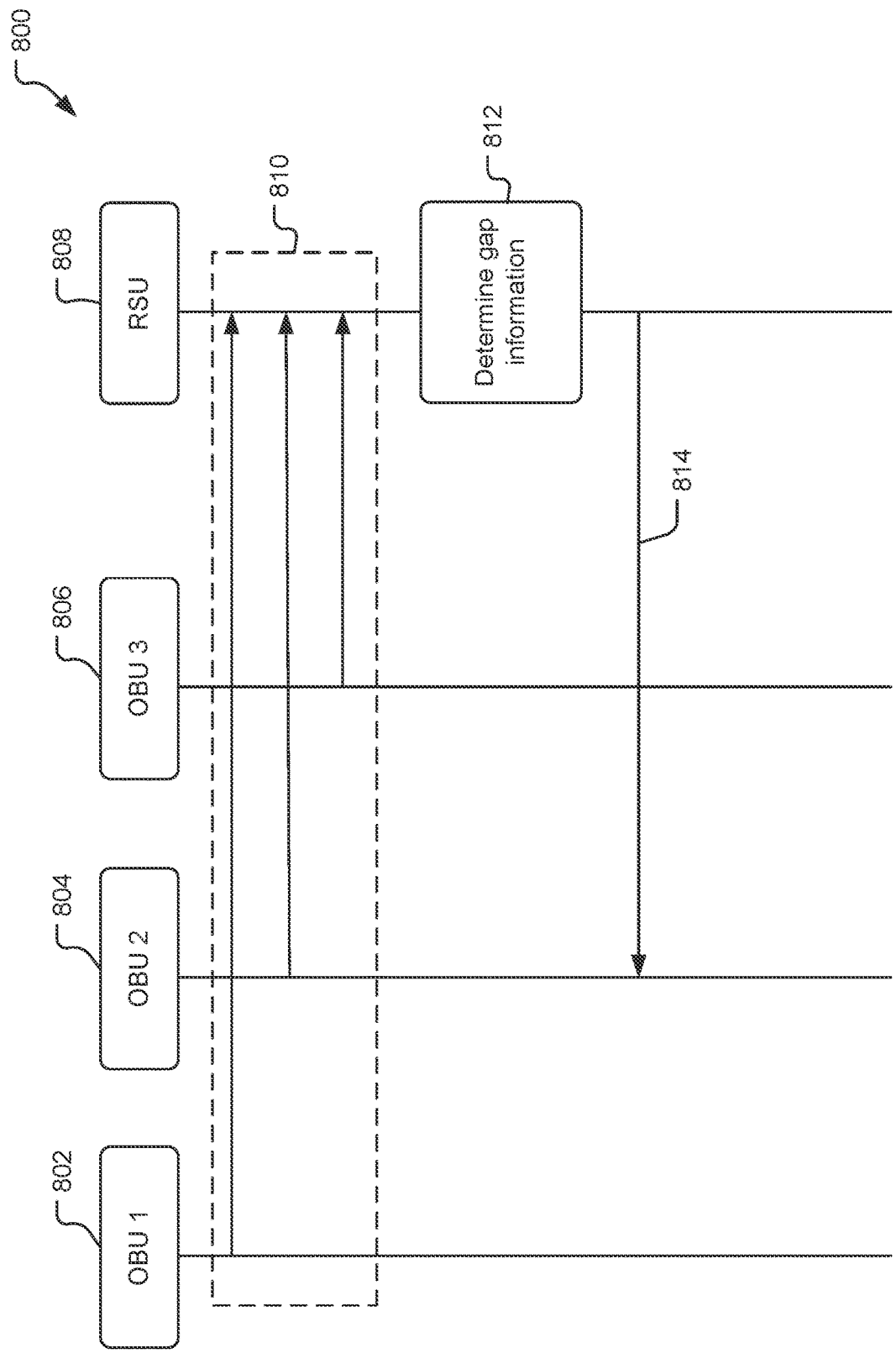
FIG. 8 is an example message flow to provide vehicle nudge information.

Referring to FIG. 8, an example message flow 800 to provide vehicle nudge information is shown. The message flow 800 includes a plurality of vehicles with OBUs and an RSU 808. The OBUs include a first OBU 802, a second OBU 804 and a third OBU 806. In an example, referring to FIGS. 6A-6C, the first OBU 802 is included in the first vehicle 610a, the second OBU 804 is included in the second vehicle 610b, and the third OBU 806 is included in the third vehicle 610c. The RSU 808 may be the RSU 602. Each of the OBUs 802, 804, 806 are configured to send BSMs 810 to the RSU 808. The BSMs 810 may include respective vehicle state information such as location information (e.g., lat/long/elev/accuracy), vehicle heading and speed, brake system status, and vehicle size information. At stage 812, the RSU 808 is configured to determine gap information based at least in part on the BSMs 810. For example, the location information for each of the vehicles may be used to detect gaps. Other inputs, such as image information from cameras and RF sensing information from vehicles and roadside sensors may be received by the RSU 808 and utilized to determine the gap information. The RSU 808 may be configured to send one or more messages including a nudge request to one or more OBUs. For example, the RSU 808 may send a nudge message 814 to the second OBU 804 based on the gap 612. In an example, referring to FIG. 9, the nudge message 814 may be a RSM with gap information in a vehicle gap container 902. The second OBU 804 is configured to obtain the gap distance information (e.g., GapDistance) from the RSM message and move or alert the vehicle operator as described. In an example, referring to FIG. 10, the nudge message 814 may be a new type of message such as the Traffic Flow Streamlining message 1002 which includes a vehicle gap container configure to describe the gap. Other signaling techniques may be used to inform the OBUs of a gap. For example, gap information may be received from other vehicles and/or cellular networks (e.g., via the Uu interface).

Figure 11:
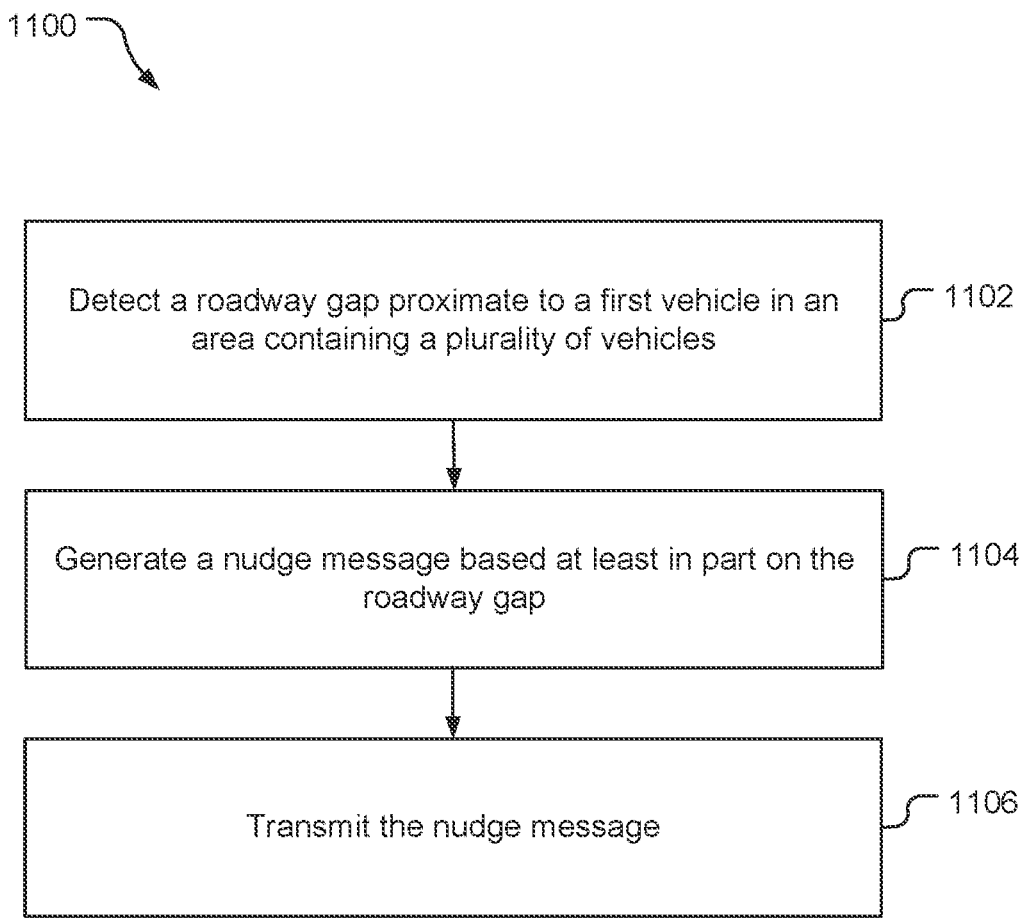
FIG. 11 is a process flow message of an example method for providing a nudge message to a vehicle.

Referring to FIG. 11, with further reference to FIGS. 1-10, a method 1100 for providing a nudge message includes the stages shown. The method 1100 is, however, an example and not limiting. The method 1100 may be altered, e.g., by having stages added, removed, rearranged, combined, performed concurrently, and/or having single stages split into multiple stages. The method 1100 may be performed by a RSU, MEC server, and/or another vehicle.

At stage 1102, the method includes detecting a roadway gap proximate to a first vehicle in an area containing a plurality of vehicles. The RSU 602, including a processor 310 and a transceiver 315, is a means for detecting a roadway gap. Other devices, such as a MEC server or vehicle may be means for detecting the roadway gap. A roadway gap may be an empty space in front of a vehicle which the vehicle may move into. For example, referring to FIGS. 6A-6C, the gap 612 is the empty space on the roadway between the first vehicle 610a and the second vehicle 610b. A RSU may be configured to detect a roadway gap based on message reports received from the plurality of vehicles in the area. For example, the message reports may be BSMs transmitted from one or more of the plurality of vehicles. The location information in the BSMs may be used to detect roadway gaps. Other sensors, such as cameras and RF sensing devices may be used to detect roadway gaps in the area. The roadway gap may exist between the vehicle and another vehicle, or between the vehicle and a roadway feature such as a traffic stop line.

At stage 1104, the method includes generating a nudge message based at least in part on the roadway gap. The RSU 602, including a processor 310, is a means for generating the nudge message. Other devices, such as a MEC server or vehicle may be means for generating the nudge message. In an example, the nudge message may be included in an enhanced RSM such as described in FIG. 9. The enhanced RSM may include vehicle gap container 902 to describe one or more features of the roadway gap (e.g., distance of a gap). The nudge message may be based on a custom message format which is compatible with V2X communication links, such as the Traffic Flow Streamlining message depicted in FIG. 10. Other messages may be generated to convey nudge information. For example, network communication messaging techniques (e.g., LTE, 5G NR, WiFi, etc.) may be used.

At stage 1106, the method includes transmitting the nudge message. The RSU 602, including a processor 310 and a transceiver 315, is a means for transmitting the nudge message. Other devices, such as a MEC server or vehicle may be means for transmitting the nudge messages. In an example, the nudge message may be an RSM transmitted to an OBU in the first vehicle via a V2X link such as PC5. Other messages, such as a Traffic Flow Streamlining message may be provided to an OBU in the first vehicle. In an example, the communications system 100 may be utilized to provide a nudge message. For example, the base station 616 may utilize the Uu interface to provide the OBU the nudge message. In an example, a MEC server may be configured to utilize a WAN connection with the vehicle to transmit the nudge message. Other signaling techniques may also be used. For example, sidelink and other D2D interfaces may be used to provide the nudge message to the first vehicle.

In an example, the nudge message may be transmitted to one or more entities comprising roadside infrastructure, such as traffic lights and signs. The first vehicle may not be a V2X capable device and the nudge information may have to be presented by an exterior device, such as the RRFB 706. Other electronic signs and signaling devices may also receive the nudge message.

The method 1100 may be performed by other entities such as the server 606 and OBUs in other vehicles. For example, a vehicle may be configured to detect a gap using RF sensing techniques and may provide a nudge message to another vehicle or a roadside entity such as the traffic light 608, or a sign configured to notify vehicle operators of gaps in the traffic. In an example, a first vehicle may be configured to determine that a second vehicle (which is behind the first vehicle) has stopped short and created a gap that can be compressed. The first vehicle may be configured detect the gap, generate the nudge message, and transmit the nudge message as described in the method 1100.

Figure 12:
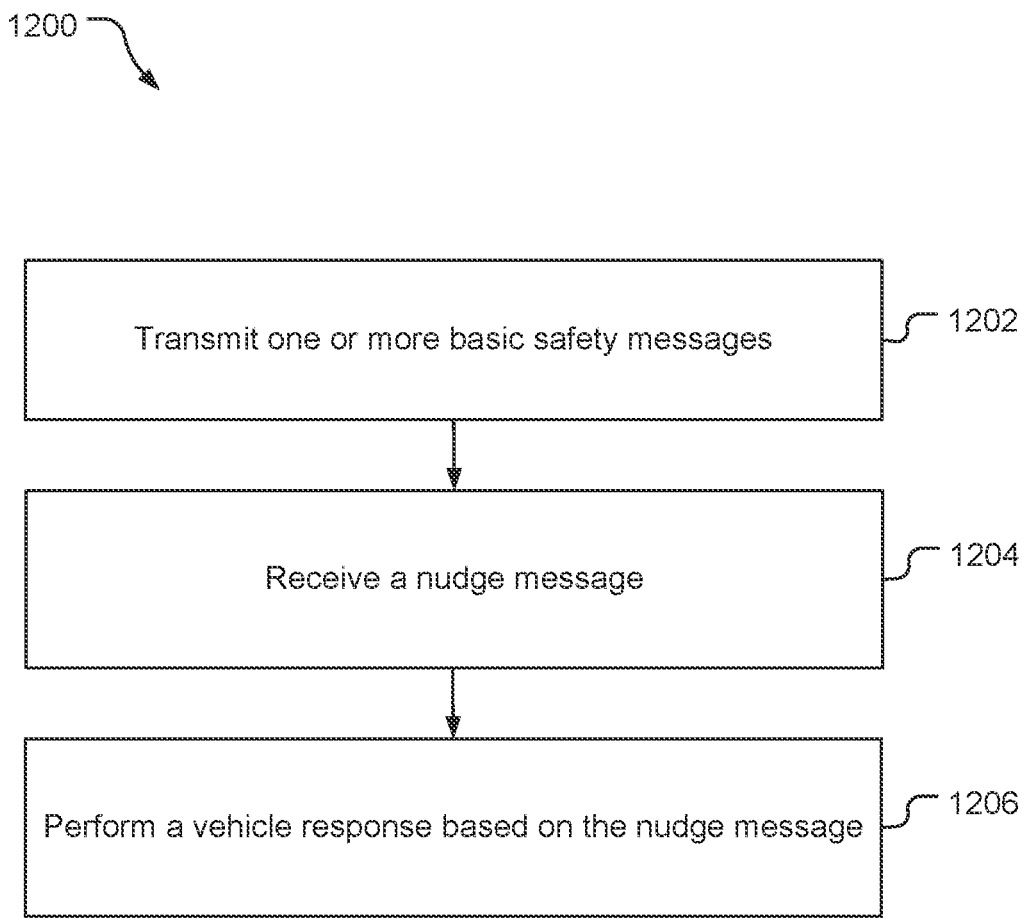
FIG. 12 is a process flow of an example method for responding to a nudge message.

Referring to FIG. 12, with further reference to FIGS. 1-10, a method 1200 for responding to a nudge message includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes transmitting one or more basic safety messages. An OBU, including processors 210 and the transceiver 215, is a means for transmitting one or more BSMs. In an example, an OBU or other wireless device may be configured to transmit BSMs to a RSU or other devices (e.g., cellular base station, MEC server, another vehicle) when within the coverage area of the RSU or the other devices. A RSU may also include a RSU controller or a master RSU configured to control multiple RSUs. The one or more BSMs may include respective vehicle state information such as location information (e.g., lat/long/elev/accuracy), vehicle heading and speed, brake system status, and vehicle size information.

At stage 1204, the method includes receiving a nudge message. The OBU, including processors 210 and the transceiver 215, is a means for receiving the nudge message. In an example, the nudge message may be an RSM transmitted to the OBU via a V2X link such as PC5. Other messages, such as a Traffic Flow Streamlining message may be provided to the OBU. In an example, the communications system 100 may be utilized to provide a nudge message to the OBU. For example, the base station 616 may utilize the Uu interface to provide the OBU the nudge message. Other signaling techniques may also be used to provide the nudge message to the OBU. For example, a the OBU may be configured to provide messages via a WAN communication protocol. In an example, the nudge message may be groupcast from a station (e.g., an RSU) to a plurality of vehicles.

At stage 1206, the method includes performing a vehicle response based on the nudge message. The OBU, including processors 210 and the transceiver 215, is a means for performing the vehicle response. In an example, the vehicle may be fully autonomous and the vehicle response may include moving the vehicle into a gap based on the nudge message. For standard vehicles, the vehicle response may include notifying the operator of a nudge instruction via a user interface. For example, a display device and/or audio output may be used to provide the operator an indication of the nudge request. In an example, the vehicle steering wheel, brake pedal, and/or operator seat may include a haptic device configured to vibrate in response to receiving the nudge message. Other notification devices may also be used to inform the operator of the nudge information. In an example, a vehicle may be configured to receive the nudge message at stage 1204 and determine if a gap exists (e.g., with on board sensors) and then move into the gap (if it exists).

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A. or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for providing nudge information, comprising: detecting a roadway gap proximate to a first vehicle in an area containing a plurality of vehicles; generating a nudge message based at least in part on the roadway gap; and transmitting the nudge message.

Clause 2. The method of clause 1 further comprising receiving one or more basic safety messages from the plurality of vehicles, wherein detecting the roadway gap is based at least in part on the one or more basic safety messages.

Clause 3. The method of clause 1 further comprising receiving image information from one or more cameras disposed in the area, wherein detecting the roadway gap is based at least in part on the image information.

Clause 4. The method of clause 1 wherein the nudge message is an enhance roadside safety message including a vehicle gap container.

Clause 5. The method of clause 4 wherein the vehicle gap container includes an indication of a length of the roadway gap.

Clause 6. The method of clause 1 wherein the nudge message is a traffic flow streamlining message.

Clause 7. The method of clause 1 wherein transmitting the nudge message includes transmitting a unicast message from a roadside unit to the first vehicle.

Clause 8. The method of clause 1 wherein transmitting the nudge message includes transmitting the nudge message from a cellular base station to the first vehicle.

Clause 9. The method of clause 1 wherein transmitting the nudge message includes transmitting the nudge message from a second vehicle to the first vehicle, wherein the second vehicle is configured to detect the roadway gap proximate to the first vehicle, and to generate the nudge message based at least in part on the roadway gap.

Clause 10. The method of clause 1 wherein transmitting the nudge message includes transmitting the nudge message from a multi-access edge computing (MEC) server to the first vehicle.

Clause 11. The method of clause 10 wherein the nudge message is transmitted via a wide area network communication protocol.

Clause 12. The method of clause 1 wherein the nudge message is groupcast to the plurality of vehicles.

Clause 13. The method of clause 1 wherein transmitting the nudge message includes transmitting the nudge message to a roadside entity proximate to the first vehicle.

Clause 14. The method of clause 13 wherein the roadside entity is a traffic light including a rectangular rapid flashing beacon.

Clause 15. The method of clause 13 wherein the roadside entity is a road sign.

Clause 16. A method for responding to a nudge message, comprising: providing one or more basic safety messages; receiving the nudge message; and performing a vehicle response based on the nudge message.

Clause 17. The method of clause 16 wherein the nudge message includes an enhanced roadside safety message including a vehicle gap container.

Clause 18. The method of clause 17 wherein the vehicle gap container includes an indication of a length of a roadway gap.

Clause 19. The method of clause 16 wherein the nudge message is a traffic flow streamlining message.

Clause 20. The method of clause 16 wherein receiving the nudge message includes receiving the nudge message from a cellular base station.

Clause 21. The method of clause 16 wherein receiving the nudge message includes receiving the nudge message from a roadside unit.

Clause 22. The method of clause 21 wherein the nudge message is included in a groupcast message.

Clause 23. The method of clause 16 wherein receiving the nudge message includes receiving the nudge message from a multi-access edge computing (MEC) server.

Clause 24. The method of clause 16 wherein the vehicle response includes moving an autonomous vehicle into a roadway gap.

Clause 25. The method of clause 16 wherein the vehicle response includes detecting a roadway gap with an onboard sensor, and providing an alert to a vehicle operator in response to detecting the roadway gap.

Clause 26. The method of clause 16 wherein the vehicle response includes presenting a visual representation of a nudge request on a display in a vehicle, presenting an audio representation of the nudge request on an audio output in the vehicle, presenting a haptic response in the vehicle, or any combinations thereof.

Clause 27. An apparatus, comprising: a memory; at least one transceiver; at least one processor communicatively coupled to the memory and the at least one transceiver, and configured to: detect a roadway gap proximate to a first vehicle in an area containing a plurality of vehicles; generate a nudge message based at least in part on the roadway gap; and transmit the nudge message.

Clause 28. The apparatus of clause 27 wherein the at least one processor is further configured to receive one or more basic safety messages from the plurality of vehicles, and detect the roadway gap based at least in part on the one or more basic safety messages.

Clause 29. The apparatus of clause 27 wherein the at least one processor is further configured to receive image information from one or more cameras disposed in the area, and detect the roadway gap based at least in part on the image information.

Clause 30. The apparatus of clause 27 wherein the nudge message is an enhance roadside safety message including a vehicle gap container.

Clause 31. The apparatus of clause 30 wherein the vehicle gap container includes an indication of a length of the roadway gap.

Clause 32. The apparatus of clause 27 wherein the nudge message is a traffic flow streamlining message.

Clause 33. The apparatus of clause 27 wherein the at least one processor is further configured to transmit a unicast message including the nudge message from a roadside unit to the first vehicle.

Clause 34. The apparatus of clause 27 wherein the at least one processor is further configured to transmit the nudge message from a cellular base station to the first vehicle.

Clause 35. The apparatus of clause 27 wherein the apparatus is disposed in a second vehicle and the at least one processor is further configured to transmit the nudge message from the second vehicle to the first vehicle, wherein the at least one processor is further configured to detect the roadway gap proximate to the first vehicle, and to generate the nudge message based at least in part on the roadway gap.

Clause 36. The apparatus of clause 27 wherein the at least one processor is further configured to transmit the nudge message from a multi-access edge computing (MEC) server to the first vehicle.

Clause 37. The apparatus of clause 36 wherein the at least one processor is further configured to transmit the nudge message via a wide area network communication protocol.

Clause 38. The apparatus of clause 36 wherein the at least one processor is further configured to transmit the nudge message via a groupcast to the plurality of vehicles.

Clause 39. The apparatus of clause 36 wherein the at least one processor is further configured to transmit the nudge message to a roadside entity proximate to the first vehicle.

Clause 40. The apparatus of clause 39 wherein the roadside entity is a traffic light including a rectangular rapid flashing beacon.

Clause 41. The apparatus of clause 39 wherein the roadside entity is a road sign.

Clause 42. An apparatus, comprising: a memory; at least one transceiver; at least one processor communicatively coupled to the memory and the at least one transceiver, and configured to: provide one or more basic safety messages; receive a nudge message; and perform a vehicle response based on the nudge message.

Clause 43. The apparatus of clause 42 wherein the nudge message includes an enhanced roadside safety message including a vehicle gap container.

Clause 44. The apparatus of clause 43 wherein the vehicle gap container includes an indication of a length of a roadway gap.

Clause 45. The apparatus of clause 42 wherein the nudge message is a traffic flow streamlining message.

Clause 46. The apparatus of clause 42 wherein the at least one processor is further configured to receive the nudge message from a cellular base station.

Clause 47. The apparatus of clause 42 wherein the at least one processor is further configured to receive the nudge message from a roadside unit.

Clause 48. The apparatus of clause 47 wherein the nudge message is included in a groupcast message.

Clause 49. The apparatus of clause 42 wherein the at least one processor is further configured to receive the nudge message from a multi-access edge computing (MEC) server.

Clause 50. The apparatus of clause 42 wherein the vehicle response includes moving an autonomous vehicle into a roadway gap.

Clause 51. The apparatus of clause 42 wherein the at least one processor is further configured to detect a roadway gap with an onboard sensor, and provide an alert to a vehicle operator in response to detecting the roadway gap.

Clause 52. The apparatus of clause 42 wherein the at least one processor is further configured to present a visual representation of a nudge request on a display in a vehicle, present an audio representation of the nudge request on an audio output in the vehicle, present a haptic response in the vehicle, or any combinations thereof.

Clause 53. An apparatus for providing nudge information, comprising: means for detecting a roadway gap proximate to a first vehicle in an area containing a plurality of vehicles; means for generating a nudge message based at least in part on the roadway gap; and means for transmitting the nudge message.

Clause 54. An apparatus for responding to a nudge message, comprising: means for providing one or more basic safety messages; means for receiving the nudge message; and means for performing a vehicle response based on the nudge message.

Clause 55. A non-transitory processor-readable storage medium comprising processor-readable instructions configured to cause one or more processors to provide nudge information, comprising code for: detecting a roadway gap proximate to a first vehicle in an area containing a plurality of vehicles; generating a nudge message based at least in part on the roadway gap; and transmitting the nudge message.

Clause 56. A non-transitory processor-readable storage medium comprising processor-readable instructions configured to cause one or more processors to respond to a nudge message, comprising code for: providing one or more basic safety messages; receiving the nudge message; and performing a vehicle response based on the nudge message.

The invention claimed is:

1. A method for providing nudge information, comprising:
  detecting a roadway gap proximate to a first vehicle in an area containing a plurality of vehicles;
  receiving an indication that the roadway gap is further detected by a server;
  generating a nudge message based at least in part on the detection of the roadway gap and the indication; and
  transmitting the nudge message.

2. The method of claim 1 further comprising receiving one or more basic safety messages from the plurality of vehicles, wherein detecting the roadway gap is based at least in part on the one or more basic safety messages.

3. The method of claim 1 further comprising receiving image information from one or more cameras disposed in the area, wherein detecting the roadway gap is based at least in part on the image information.

4. The method of claim 1 wherein the nudge message is at least one of an enhanced roadside safety message including a vehicle gap container or a traffic flow streamlining message.

5. The method of claim 1 wherein transmitting the nudge message includes transmitting a unicast message from a roadside unit to the first vehicle.

6. The method of claim 1 wherein transmitting the nudge message includes transmitting the nudge message from a cellular base station to the first vehicle.

7. The method of claim 1 wherein transmitting the nudge message includes transmitting the nudge message from a second vehicle to the first vehicle, wherein the second vehicle is configured to detect the roadway gap proximate to the first vehicle, and to generate the nudge message based at least in part on the detection of the roadway gap and the indication.

8. The method of claim 1 wherein transmitting the nudge message includes transmitting the nudge message from a multi-access edge computing (MEC) server to the first vehicle.

9. The method of claim 1 wherein the nudge message is groupcast to the plurality of vehicles.

10. The method of claim 1 wherein transmitting the nudge message includes transmitting the nudge message to a roadside entity proximate to the first vehicle, wherein the roadside entity is one of a traffic light including a rectangular rapid flashing beacon or a road sign.

11. A method for responding to a nudge message, comprising:
providing one or more basic safety messages;
receiving the nudge message based on a detection of a roadway gap proximate to a vehicle in an area containing a plurality of vehicles, by a roadside entity proximate to the vehicle, and further based on receipt of an indication that the roadway gap is further detected by a server;
and performing a vehicle response based on the nudge message.

12. The method of claim 11 wherein the nudge message includes at least one of an enhanced roadside safety message including a vehicle gap container, or a traffic flow streamlining message.

13. The method of claim 12 wherein the vehicle gap container or the traffic flow streamlining message includes an indication of a length of the roadway gap.

14. The method of claim 11 wherein receiving the nudge message includes receiving the nudge message from a cellular base station.

15. The method of claim 11 wherein receiving the nudge message includes receiving the nudge message from a roadside unit.

16. The method of claim 15 wherein the nudge message is included in a groupcast message.

17. The method of claim 11 wherein receiving the nudge message includes receiving the nudge message from a multi-access edge computing (MEC) server.

18. The method of claim 11 wherein the vehicle response includes detecting the roadway gap with an onboard sensor, and providing an alert to a vehicle operator in response to detecting the roadway gap.

19. The method of claim 11 wherein the vehicle response includes presenting a visual representation of a nudge request on a display in a vehicle, presenting an audio representation of the nudge request on an audio output in the vehicle, presenting a haptic response in the vehicle, or any combinations thereof.

20. An apparatus, comprising:
a memory;
at least one transceiver;
at least one processor communicatively coupled to the memory and the at least one transceiver, and configured to:
detect a roadway gap proximate to a first vehicle in an area containing a plurality of vehicles;
receive an indication the roadway gap is further detected by a server;
generate a nudge message based at least in part on the detection of the roadway gap and the indication; and
transmit the nudge message.

21. The apparatus of claim 20 wherein the at least one processor is further configured to receive one or more basic safety messages from the plurality of vehicles, and detect the roadway gap based at least in part on the one or more basic safety messages.

22. The apparatus of claim 20 wherein the at least one processor is further configured to receive image information from one or more cameras disposed in the area, and detect the roadway gap based at least in part on the image information.

23. The apparatus of claim 20 wherein the nudge message is an enhanced roadside safety message including a vehicle gap container or a traffic flow streamlining message.

24. The apparatus of claim 20 wherein the at least one processor is further configured to transmit a unicast message including the nudge message from a roadside unit to the first vehicle.

25. The apparatus of claim 20 wherein the at least one processor is further configured to transmit the nudge message from a cellular base station to the first vehicle.

26. The apparatus of claim 20 wherein the apparatus is disposed in a second vehicle and the at least one processor is further configured to transmit the nudge message from the second vehicle to the first vehicle, wherein the at least one processor is further configured to detect the roadway gap proximate to the first vehicle, and to generate the nudge message based at least in part on the detection of the roadway gap and the indication.

27. An apparatus, comprising:
a memory;
at least one transceiver;
at least one processor communicatively coupled to the memory and the at least one transceiver, and configured to:
provide one or more basic safety messages;
receive a nudge message based on a detection of a roadway gap proximate to a vehicle in an area containing a plurality of vehicles, by a roadside entity proximate to the vehicle, and further based on receipt of an indication that the roadway gap is further detected by a server;
and perform a vehicle response based on the nudge message.

28. The apparatus of claim 27 wherein the at least one processor is further configured to receive the nudge message from a cellular base station.

29. The apparatus of claim 27 wherein the at least one processor is further configured to receive the nudge message from a roadside unit.

30. The apparatus of claim 27 wherein the nudge message is included in a groupcast message.

* * * * *